US008010960B2

(12) United States Patent
Gerhart et al.

(10) Patent No.: US 8,010,960 B2
(45) Date of Patent: Aug. 30, 2011

(54) SYSTEM AND METHOD FOR PROVIDING A SOFTWARE INSTALLATION OR REMOVAL STATUS DISPLAY

(75) Inventors: G. Brent Gerhart, Plymouth Meeting, PA (US); Christopher A. Lunemann, Jim Thorpe, PA (US); Leggie M. Willis, Philadelphia, PA (US)

(73) Assignee: Honeywell International Inc., Morristown, NJ (US)

( * ) Notice: Subject to any disclaimer, the term of this patent is extended or adjusted under 35 U.S.C. 154(b) by 1673 days.

(21) Appl. No.: 11/289,966

(22) Filed: Nov. 30, 2005

(65) Prior Publication Data

US 2007/0220317 A1    Sep. 20, 2007

(51) Int. Cl.
 *G06F 9/44* (2006.01)
(52) U.S. Cl. ........................ 717/174; 715/772
(58) Field of Classification Search .................. None
 See application file for complete search history.

(56) References Cited

U.S. PATENT DOCUMENTS

| | | | | |
|---|---|---|---|---|
| 5,859,640 A | * | 1/1999 | de Judicibus | 715/710 |
| 5,960,206 A | * | 9/1999 | Barsness et al. | 717/174 |
| 6,266,811 B1 | * | 7/2001 | Nabahi | 717/174 |
| 6,275,987 B1 | * | 8/2001 | Fraley et al. | 717/127 |
| 6,301,580 B1 | * | 10/2001 | Eigel-Danielson | 1/1 |
| 6,490,722 B1 | * | 12/2002 | Barton et al. | 717/174 |
| 6,536,040 B1 | * | 3/2003 | Curtis | 717/174 |
| 6,615,274 B1 | * | 9/2003 | Achtermann et al. | 709/244 |
| 7,171,628 B1 | * | 1/2007 | Perttunen | 715/853 |
| 7,343,566 B1 | * | 3/2008 | Chaudhri et al. | 715/781 |
| 7,367,017 B2 | * | 4/2008 | Maddocks et al. | 717/115 |
| 2001/0055017 A1 | * | 12/2001 | Ording | 345/440 |
| 2004/0003131 A1 | | 1/2004 | Curtis | |
| 2004/0015961 A1 | * | 1/2004 | Chefalas et al. | 717/178 |
| 2005/0102667 A1 | | 5/2005 | Barta et al. | |

OTHER PUBLICATIONS

Hitachi StarBoard Software Installation Guide, Jan. 23, 2003, pp. 1-10, Retrieved on [Apr. 22, 2011], Retrieved from the Internet:URL<http://www.hitachisolutions-eu.com/de/downloads/HitachiStarBoardSoftwareInstallationGuideC.pdf>.*
Robert Beatty, "SQL Server 2005 Setup and Deployment," InformIT, Oct. 28, 2005, 13 pages.

* cited by examiner

*Primary Examiner* — Thuy Dao
*Assistant Examiner* — Cheneca Smith
(74) *Attorney, Agent, or Firm* — Munck Carter, LLP

(57) ABSTRACT

A method includes initiating an installation of software on a device or a removal of software from the device. The installation or removal of the software involves a plurality of installers capable of installing software components on or removing the software components from the device. The method also includes presenting a status panel associated with the installation or removal of the software to a user. The status panel identifies a plurality of operations associated with the installation or removal of the software and a status of each of the operations. The plurality of operations is associated with at least two different installers. The status panel includes at least one indicator that repeatedly changes to indicate that the installation or removal of the software is progressing.

20 Claims, 3 Drawing Sheets

SYSTEM AND METHOD FOR PROVIDING A SOFTWARE INSTALLATION OR REMOVAL STATUS DISPLAY

TECHNICAL FIELD

This disclosure relates generally to computing systems and more specifically to a system and method for providing a software installation or removal status display.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, the installation or removal of software on system components is typically a time-consuming process. This is often because many different software modules and subsystems need to be installed on or removed from the components. During the installation or removal of software on the components of the conventional process control systems, visual feedback identifying the progress of the software installation or removal is often provided, but only for an individual software module or subsystem. Also, there may be periods of time during which nothing appears to be happening when software is being installed on or removed from the components in the conventional process control systems.

SUMMARY

This disclosure provides a system and method for providing a software installation or removal status display.

In a first embodiment, a method includes initiating an installation of software on a device or a removal of software from the device. The installation or removal of the software involves a plurality of installers capable of installing software components on or removing the software components from the device. The method also includes presenting a status panel associated with the installation or removal of the software to a user. The status panel identifies a plurality of operations associated with the installation or removal of the software and a status of each of the operations. The plurality of operations is associated with at least two different installers. The status panel includes at least one indicator that repeatedly changes to indicate that the installation or removal of the software is progressing.

In particular embodiments, the method further includes coordinating execution of the installers to install the software on or remove the software from the device.

In other particular embodiments, the status panel includes a plurality of visual indicators identifying the status of the operations, and the at least one indicator that repeatedly changes includes the visual indicator associated with the operation currently being performed.

In a second embodiment, an apparatus includes at least one processor capable of initiating an installation of software on a device or a removal of software from the device. The installation or removal of the software involves a plurality of installers capable of installing software components on or removing the software components from the device. The apparatus also includes a display capable of presenting a status panel associated with the installation or removal of the software to a user. The status panel identifies a plurality of operations associated with the installation or removal of the software and a status of each of the operations. The plurality of operations is associated with at least two different installers. The status panel includes at least one indicator that repeatedly changes to indicate that the installation or removal of the software is progressing.

In a third embodiment, a computer program is embodied on a computer readable medium and is operable to be executed by a processor. The computer program includes computer readable program code for initiating an installation of software on a device or a removal of software from the device. The installation or removal of the software involves a plurality of installers capable of installing software components on or removing the software components from the device. The computer program also includes computer readable program code for generating a status panel associated with the installation or removal of the software to a user. The status panel identifies a plurality of operations associated with the installation or removal of the software and a status of each of the operations. The plurality of operations is associated with at least two different installers. The status panel includes at least one indicator that repeatedly changes to indicate that the installation or removal of the software is progressing.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely. Definitions for additional words and phrases may be provided throughout this patent document. Those of ordinary skill in the art will understand that such definitions apply in many, if not most or all, instances to prior as well as future uses of the defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
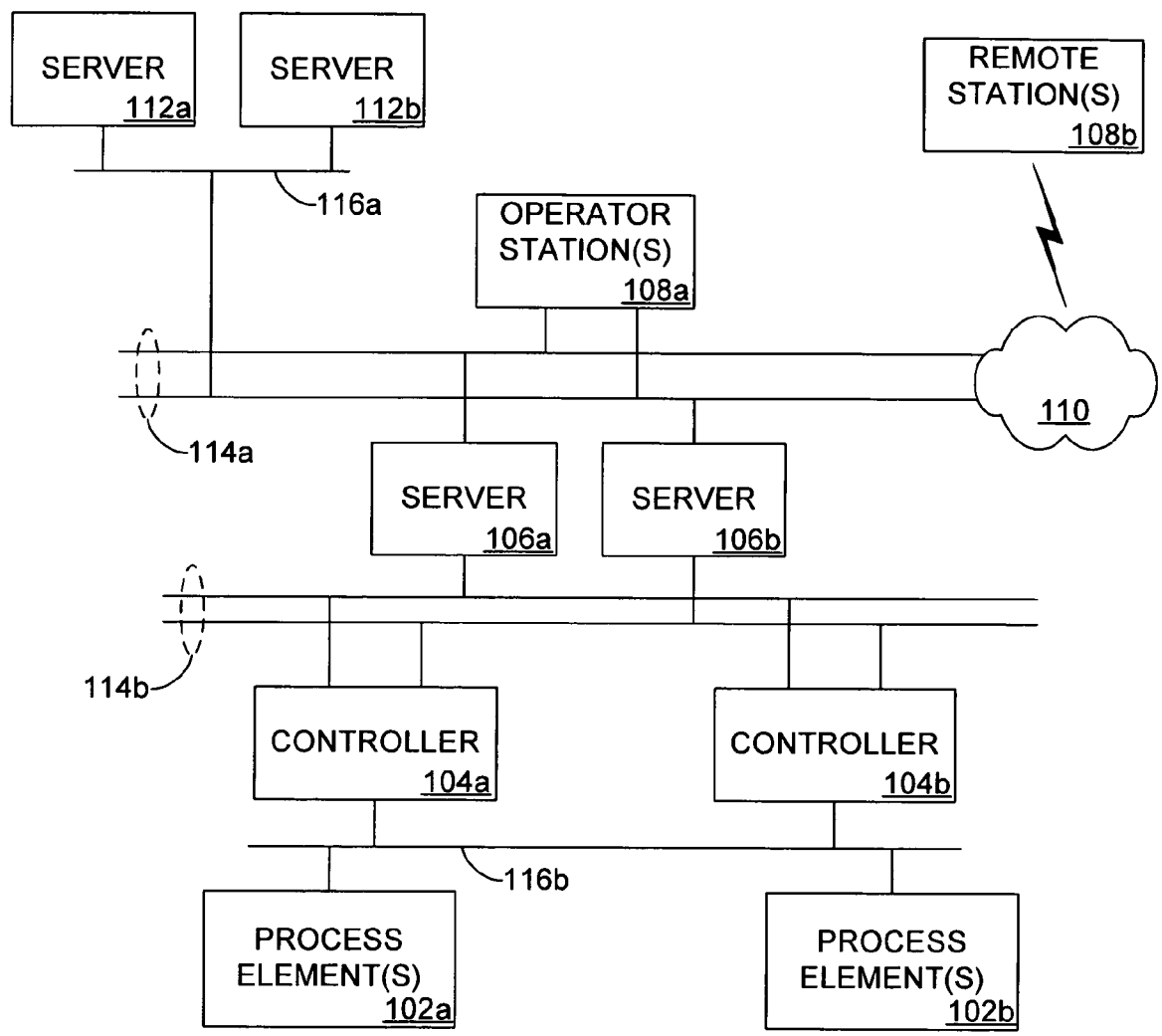
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102a represent components in a process or production system that may perform any of a wide variety of functions. For example, the process elements 102a-102a could represent motors, catalytic crackers, valves, and other industrial equipment in a production environment. The process elements 102a-102a could represent any other or additional components in any suitable process or production system. Each of the process elements 102a-102a includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. Each of the controllers 104a-104b includes any hardware, software, firmware, or combination thereof for controlling one or more of the process elements 102a-102b. The controllers 104a-104b could, for example, include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102a using information collected by the controllers 104a-104b and servers 106a-106b. The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. The operator stations 108a-108b could, for example, represent personal computers having displays and processors executing a MICROSOFT WINDOWS operating system.

In this example, at least one of the operator stations 108b is a remote station. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example embodiment, the system 100 includes two additional servers 112a-112b. The servers 112a-112a execute various applications to control the overall operation of the system 100. For example, the system 100 could be used in a processing or production plant or other facility, and the servers 112a-112a could execute applications used to control the plant or other facility. As particular examples, the servers 112a-112b could execute applications such as enterprise resource planning (ERP), manufacturing execution system (MES), or any other or additional plant or process control applications. Each of the servers 112a-112a includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks.

In one aspect of operation, software may be installed on or removed from various components in the system 100 (such as the servers 106a-106b and the operator stations 108a-108b). The software may, for example, implement logic used to control or monitor the controllers 104a-104b or other logic used in the system 100. A software installation or removal in the system 100 could possibly involve the installation or removal of a large number of software modules and subsystems (referred to collectively as "software components"). Also, each individual software component or group of software components could be installed or removed using a different installer or removal application (referred to as "installers"). In addition, the software being installed on a component of the system 100 could be provided to the component of the system 100 over a network (such as networks 114a), using a physical storage medium (such as a CD or DVD), or in any other suitable manner.

During a software installation or removal, a status panel is displayed to a user. The status panel provides various information about the software installation or removal to the user. For example, the status panel could identify various operations that occur during the software installation or removal. The status panel could also identify the operation that is currently being performed, any operations that have been completed, and any operations that remain to be completed. At least some of these operations may be associated with different installers. The status panel could further identify general or detailed information about the current operation being performed or about the overall installation or removal process, such as the estimated amount of time remaining before completion of the current operation and the estimated amount of time remaining before completion of the entire installation or removal process. In addition, the status panel could include one or more indicators that repeatedly change (such as once every second). The status panel may provide this information even when multiple installers are required in order to install or remove the software program.

By identifying the various operations and the status of each operation in a software installation or removal process, a user is able to determine the overall status of the process. Also, the user is able to identify how much of the software installation or removal process remains to be completed. In addition, by including an indicator that repeatedly changes, the user is able to determine that the software installation or removal process is progressing, even during periods of time when nothing appears to be happening to the user. This may be particularly useful when multiple installers are required to install or remove the software program.

Figure 2:
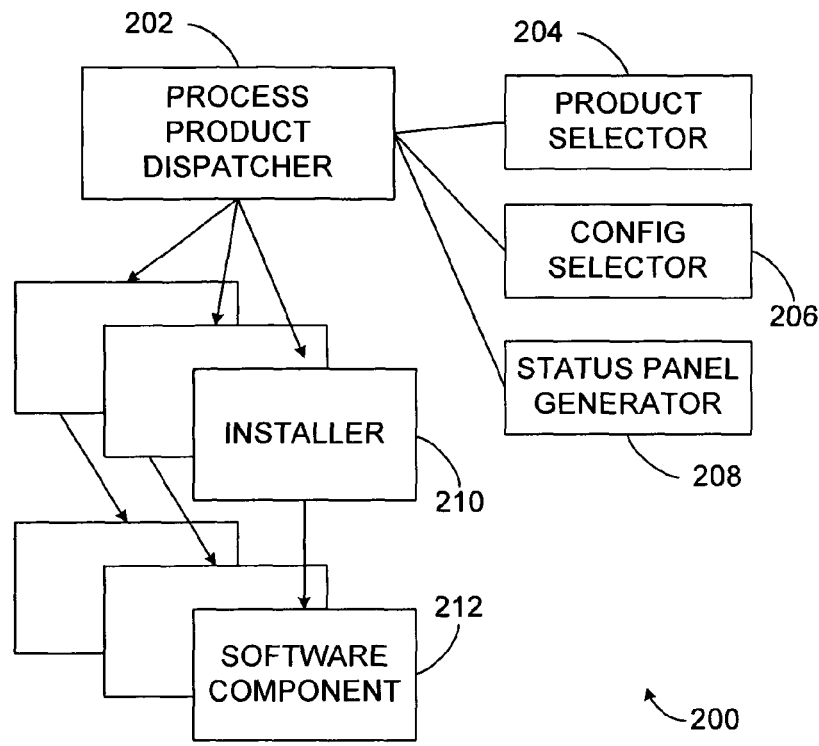
FIG. 2 illustrates an example system for software installation or removal according to one embodiment of this disclosure.
Figure 3:
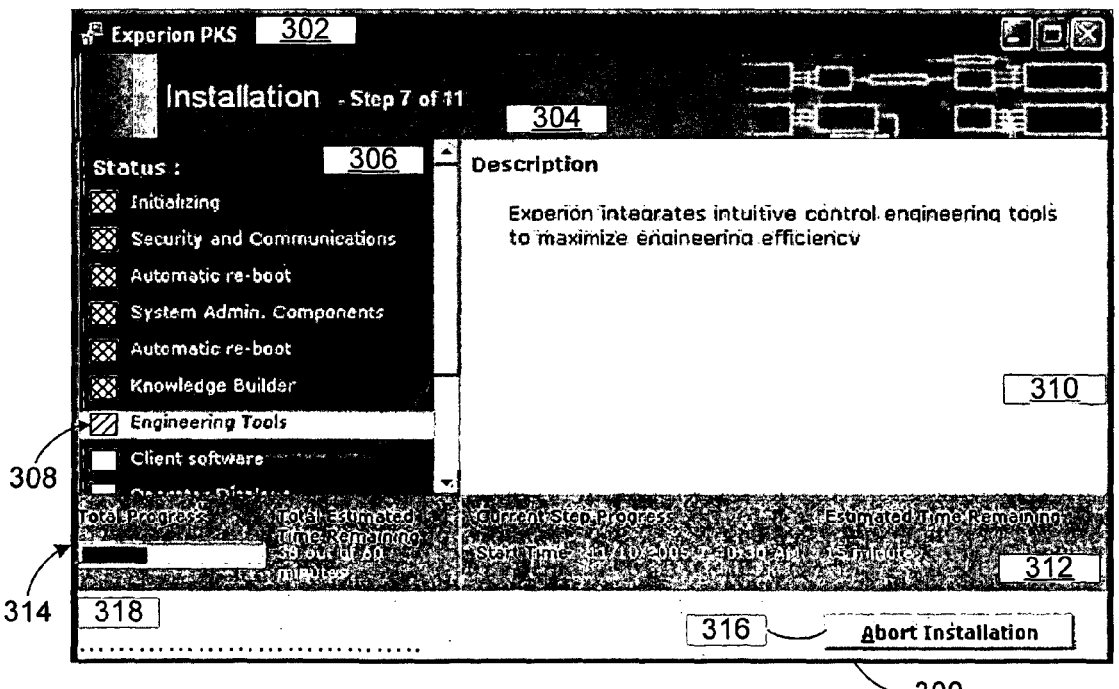
FIG. 3 illustrates an example status panel identifying a software installation or removal status according to one embodiment of this disclosure.

The status panel could be generated by any suitable element in the system 100, such as a server 106a or 106b or an operator station 108a or 108b. One example of a software installation and removal mechanism for installing and removing software is shown in FIG. 2, which is described below. The software installation and removal mechanism could generate a status panel and could be used within any suitable component of FIG. 1. Also, the status panel could be displayed on any suitable component in the system 100, such as when the status panel is displayed to a user using an operator station 108a or 108b. An example embodiment of the status panel is shown in FIG. 3, which is described below.

Although FIG. 1 illustrates one example of a process control system 100, various changes may be made to FIG. 1. For example, a control system could include any number of process elements, controllers, servers, and operator stations. Also, FIG. 1 illustrates one operational environment in which a status panel could be used during a software installation or removal process. The status panel could be used in any other suitable device or system, whether the system is a process control or non-process control system.

FIG. 2 illustrates an example system 200 for software installation or removal according to one embodiment of this disclosure. The embodiment of the system 200 shown in FIG. 2 is for illustration only. Other embodiments of the software installation or removal system could be used without departing from the scope of this disclosure. Also, for ease of explanation, the system 200 of FIG. 2 is described as operating within the process control system 100 of FIG. 1. The system 200 could be used in any other suitable system.

In this example, the system 200 includes a process product dispatcher 202. The process product dispatcher 202 controls the overall installation or removal of software on a component of the system 100. For example, the process product dispatcher 202 could initiate other processes or tasks that are needed to install or remove a software program on a server 106a or 106b or on an operator station 108a or 108b. In this way, the process product dispatcher 202 represents a top-level software installation or removal controller that coordinates the activities of other modules to install or remove software on a component of the system 100. The process product dispatcher 202 includes any hardware, software, firmware, or combination thereof for controlling the installation or removal of software on a system component. The process product dispatcher 202 could, for example, represent one or more software modules.

A product selector 204 allows a user to control which software is installed on or removed from a component of the system 100. For example, the product selector 204 could identify one or more software programs that can be selected for installation on a server 106a or 106b or on an operator station 108a or 108b. The product selector 204 could also identify one or more software programs installed on a server 106a or 106b or on an operator station 108a or 108b that can be selected for removal. In some embodiments, the product selector 204 may be invoked or initiated by the process product dispatcher 202. The product selector 204 includes any hardware, software, firmware, or combination thereof for selecting software for installation or removal on a system component. The product selector 204 could, for example, represent one or more software modules.

A configuration selector 206 allows a user to configure the installation or removal of selected software on a component of the system 100. For example, the configuration selector 206 could allow the user to provide information that affects how the selected software is installed on or removed from a server 106a or 106b or an operator station 108a or 108b. As particular examples, the configuration selector 206 could allow the user to define the type or types of networks coupled to the server or operator station and to identify the network address of the server or operator station. This information may then be used to ensure proper installation of the correct software components on the server or operator station. In some embodiments, the configuration selector 206 may be invoked or initiated by the process product dispatcher 202. The configuration selector 206 includes any hardware, software, firmware, or combination thereof for configuring a software installation or removal. The configuration selector 206 could, for example, represent one or more software modules.

A status panel generator 208 generates information representing a status panel that is displayed to a user. The status panel identifies the progress of a software installation or removal. The status panel may, for example, identify the overall status of the installation or removal process and provide a list of the operations of the process. The status panel may also identify the operation currently in progress, any operations that have been completed, and any operations remaining. The status panel generator 208 includes any hardware, software, firmware, or combination thereof for generating information representing a status panel. The status panel generator 208 could, for example, represent one or more software modules. As a particular example, the status panel generator 208 could represent one or more software modules written in C, C++, C#, Visual Basic, WinBatch, or any other or additional high-level or other code.

In some embodiments, the status panel generator 208 represents a stand-alone application that is launched by the process product dispatcher 202. After that, the status panel generator 208 may be executed independently of the process product dispatcher 202. Also, in some embodiments, the status panel generator 208 includes an application programming interface (API) or other interface. In these embodiments, the information presented in a status panel generated by the status panel generator 208 (such as a list of the operations of the installation or removal process) may be provided to the status panel generator 208 through the API or other interface.

As noted above, the process product dispatcher 202 may represent a top-level controller that coordinates the activities of other modules to install or remove software on a component of the system 100. These other modules could include installers 210. The installers 210 represent applications that may install individual software components 212 (such as software modules or entire software subsystems) on or remove individual software components 212 from a system component. An installer 210 could also be capable of installing a group of software components or removing a group of software components from the system component. The software components 212 may perform a wide variety of disparate functions in the system 100, such as configuration of the control system, operational monitoring, and alarm generation. Also, the installation or removal of this software may represent a complex process, such as when the order of installing the software subsystems is important because of inter-subsystem dependencies between the subsystems.

In these embodiments, the process product dispatcher 202 may sequence and coordinate the individual installers 210 to ensure that the installers 210 are executed in the appropriate order. In this way, the process product dispatcher 202 supports a hierarchical software installation or removal architecture in the system 100. Also, the status panel generated by the status panel generator 208 and displayed to a user may contain (among other things) a top-level or summary view of the whole installation or removal process, even when multiple installers 210 are needed for the process.

The system 200 shown in FIG. 2 could be implemented or supported on any suitable component in the process control system 100 of FIG. 1. For example, the system 200 could be implemented or supported on a server 106a or 106b or an operator station 108a or 108b. The system 200 could then provide the information representing the status panel to any suitable component, such as an operator station 108a or 108b, for presentation of the status panel to the user.

Although FIG. 2 illustrates one example of a system 200 for software installation or removal, various changes may be made to FIG. 2. For example, the system 200 could include any other or additional components according to particular needs. Also, various components shown in FIG. 2 could be combined or further subdivided.

FIG. 3 illustrates an example status panel 300 identifying a software installation or removal status according to one embodiment of this disclosure. The embodiment of the status panel 300 shown in FIG. 3 is for illustration only. Other embodiments of the status panel could be used without departing from the scope of this disclosure. Also, for ease of explanation, the status panel 300 of FIG. 3 is described with respect to the system 200 of FIG. 2 operating within the process control system 100 of FIG. 1. The status panel 300 could be used in any other suitable device and in any other suitable system.

As shown in FIG. 3, the status panel 300 contains various information associated with a software installation or removal process. In this example, the status panel 300 includes a header 302, which generally identifies the software program being installed on or removed from a component of the system 100. The status panel 300 also includes an installation/removal summary 304, which identifies the total number of operations to be performed and the number of the current operation.

The status panel 300 further includes a list 306 of the operations associated with the software installation or removal process. The operations may represent any suitable aspects of the software installation or removal process. For example, an operation could represent the installation or removal of a particular software component, the initialization of the process, a reboot of the system component, or the termination of the process. The operation currently being performed is highlighted in the list 306.

Each operation in the list 306 is associated with a status box 308. The status box 308 identifies the status of the associated operation. For example, a status box 308 could have one color, shading, or other visual indicator if the associated operation is complete. A status box 308 could have a different color, shading, or other visual indicator if the associated operation is currently being performed. A status box 308 could have a third color, shading, or other visual indicator if the associated operation is not complete and is not currently being performed. Any other or additional indicators could be used to identify the status of the operations associated with the software installation or removal process. As an example, completed operations could be identified using italicized text, the current operation could be identified using bold text, and the remaining operations could be identified using normal text. In these embodiments, the status boxes 308 could be omitted from the status panel 300.

A description area 310 in the status panel 300 contains information about the current operation or information about the overall installation or removal process. The description area 310 could, for example, contain information identifying the purpose of the current operation or information describing the functions of the current software component being installed.

A current operation status area 312 identifies the status of the current operation of the process being performed. In this example, the current operation status area 312 identifies the start time of the current operation. The current operation status area 312 also identifies the estimated time needed to complete the current operation. In some embodiments, the estimated time needed to complete the current operation is shown only if the estimated time exceeds a threshold, such as one minute or several minutes.

An overall process status area 314 identifies the overall status of the software installation or removal process. In this example, the overall process status area 314 includes a bar graph identifying the total progress of the software installation or removal process. The overall process status area 314 also identifies the total estimated time remaining to complete the software installation or removal, such as by identifying the estimated amount of time remaining within a total estimated time.

In addition, the status panel 300 includes an abort button 316. The abort button 316 may cause the software installation or removal process to abort as soon as the current operation is completed. Depending on the implementation, an aborted software installation or removal process may be restarted at a later time, such as by resuming the software installation or removal process starting at the first uncompleted operation.

In some embodiments, the status panel 300 includes one or more indicators that repeatedly change, allowing a user to verify that the software installation or removal process is proceeding. For example, one or more status boxes 308 could flash (such as by changing colors) or otherwise change periodically or routinely. As a particular example, the status box 308 for the highlighted operation in the list 306 could flash. In other embodiments, the status panel 300 could include an indicator area 318 having one or more indicators that repeatedly change. As a particular example, the indicator area 318 could include a sequence of periods (".") where periods are periodically or routinely added or removed from the indicator area 318. Any other or additional indicators could also be used in the status panel 300.

In particular embodiments, the process product dispatcher 202 of FIG. 2 interacts with the status panel generator 208 of FIG. 2 to generate the status panel 300. For example, the process product dispatcher 202 could exchange commands or messages with the status panel generator 208, where at least some of the commands or messages control how the status panel generator 208 generates the status panel 300. As a particular example, commands or messages could be provided to the status panel generator 208 to identify the contents of the header 302 and the list 306 in the status panel 300. A command or message could also be used to provide the contents of the description area 310 to the status panel generator 208. An update command or message could cause the status panel generator 208 to update the status panel 300 with any new information. A "heartbeat on item #N" command or message could cause the status panel generator 208 to begin flashing the $N^{th}$ status box 308 in the list 306. A close command or message could cause the status panel generator 208 to close the status panel 300. An abort command or message may be sent from the status panel generator 208 to the process product dispatcher 202 to indicate that the abort button 316 has been selected. Any other or additional interactions between the process product dispatcher 202 and the status panel generator 208 could also be used to support the creation and use of the status panel 300.

In some embodiments, different operations or groups of operations listed in the status panel 300 are associated with or performed by different installers 210. Each individual installer 210 may have no knowledge about the status of the other installers 210. The status panel 300, however, may represent or identify the overall status of the entire installation process.

Although FIG. 3 illustrates one example of a status panel 300 identifying a software installation or removal status, various changes may be made to FIG. 3. For example, the arrangement and composition of the status panel 300 is for illustration only. Any other or additional information could be presented in the status panel 300, and the information shown in the status panel 300 could be arranged in any suitable manner.

Figure 4:
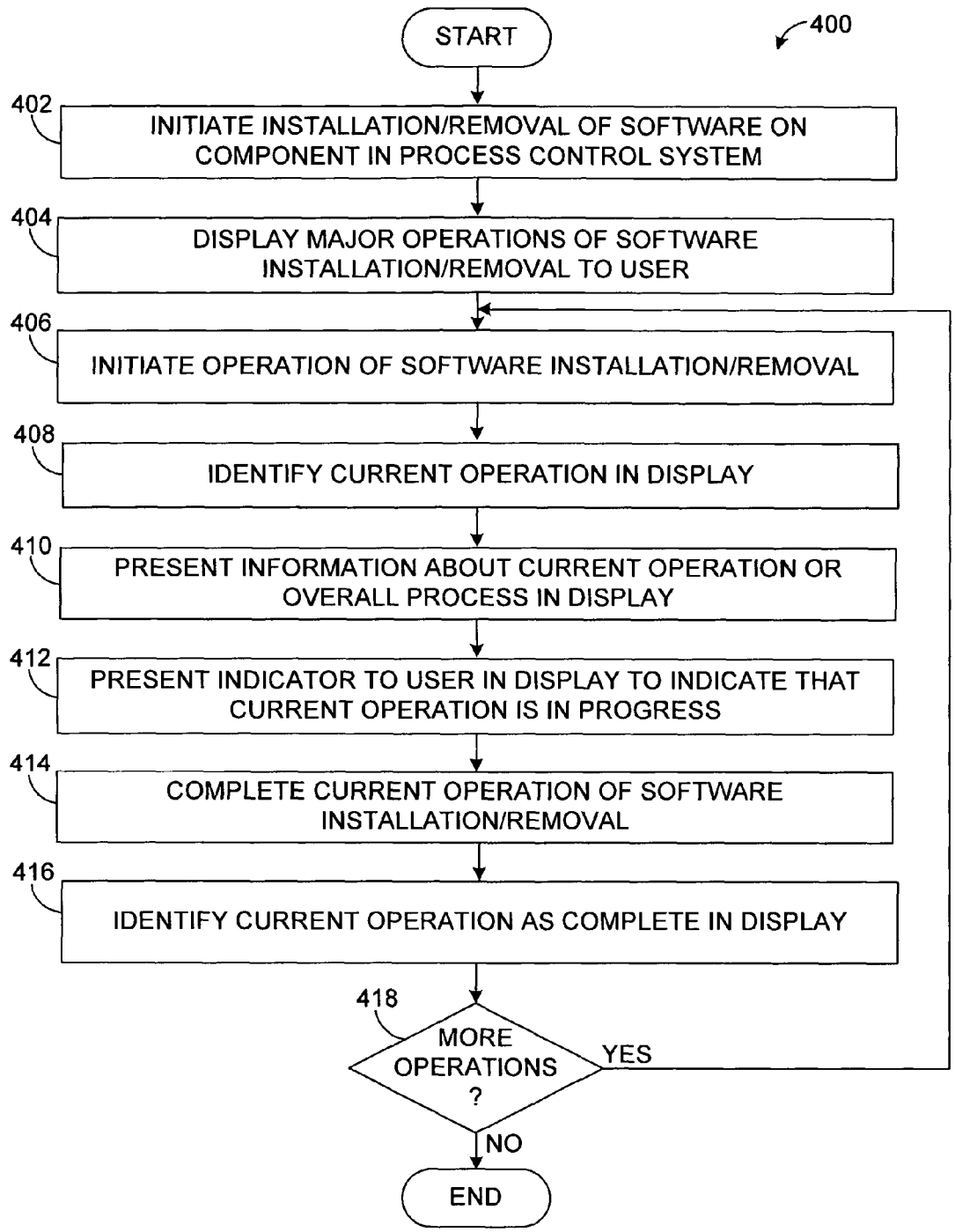
FIG. 4 illustrates an example method for displaying a software installation or removal status according to one embodiment of this disclosure.

FIG. 4 illustrates an example method 400 for displaying a software installation or removal status according to one embodiment of this disclosure. For ease of explanation, the method 400 of FIG. 4 is described with respect to the status panel 300 of FIG. 3 being used in the process control system 100 of FIG. 1. The method 400 could be used with any other suitable status panel and in any other suitable device or system.

A software installation or removal involving a component of the system 100 is initiated at step 402. This may include, for example, a user using an operator station 108a or 108b to initiate a software installation or a software removal via the process product dispatcher 202. The process product dispatcher 202 could reside on the operator station 108a or 108b being used by the user or on another component in the system 100. This may also include the user identifying the software program to be installed or removed using the product selector 204 and configuring the installation or removal using the configuration selector 206. The software installation or removal could involve any suitable component of the system 100, such as a server 106a or 106b or an operator station 108a or 108b.

Major operations of the software installation or removal are displayed to the user at step 404. This may include, for example, the process product dispatcher 202 providing one or more commands or messages to the status panel generator 208 identifying the major operations. This may also include the status panel generator 208 generating a status panel 300 that lists the major operations. The identified operations may be associated with multiple installers 210.

One of the operations of the software installation or removal is initiated at step 406. This may include, for example, the process product dispatcher 202 invoking installation or removal of a software component on the system component by invoking the appropriate installer 210. This may also include the installer 210 initiating a reboot of the system component or initiating any other actions.

The current operation being performed is identified in the display at step 408. This may include, for example, the status panel generator 208 highlighting the current operation in the list 306. This may also include updating the status panel 300 so that the status box 308 associated with the current operation has a certain color, pattern, or other visual indicator. As a particular example, this could include updating the status panel 300 so that the status box 308 associated with the current operation is blue.

Information about the current operation or about the overall process is presented in the display at step 410. This may include, for example, the status panel generator 208 placing text describing the current operation in the description area 310. This may also include the status panel generator 208 identifying a start time and an estimated time to completion for the current operation in the status panel 300. This may further include the status panel generator 208 identifying how much of the overall process has been completed and an estimated time to completing the entire process in the status panel 300.

An indicator indicating that the current operation is proceeding is displayed to the user at step 412. This may include, for example, the status panel generator 208 causing the status box 308 associated with the current operation to flash. This may also include the status panel generator 208 causing periods or other indicators in the indicator area 318 of the display panel 300 to repeatedly change.

At some point, the current operation is completed at step 414. The current operation is then identified as being complete in the display at step 416. This may include, for example, updating the status panel 300 so that the status box 308 associated with the completed operation has another color, pattern, or other visual indicator. As a particular example, this could include updating the status panel 300 so that the status box 308 associated with the completed operation is green.

If one or more operations remain to be completed at step 418, the method 400 returns to step 406 to initiate another operation in the software installation or removal process. Otherwise, all operations of the installation or removal process have been completed, and the method 400 ends. At this point, the status panel 300 may be closed, and the installation or removal process has successfully installed or removed a software program on the specified system component.

Although FIG. 4 illustrates one example of a method 400 for displaying a software installation or removal status, various changes may be made to FIG. 4. For example, while shown as a series of steps, various steps shown in FIG. 4 could occur in parallel. As a particular example, steps 408-412 could all occur in parallel by updating the status panel 300 once so that the updated status panel 300 includes all of the information displayed in steps 408-412.

In some embodiments, the various functions performed in conjunction with a software installation or removal status panel are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    initiating an installation of software on a device or a removal of software from the device, the installation or removal of the software involving a plurality of operations, the software comprising a plurality of software components, each operation associated with at least one of the software components;
    employing a plurality of installers configured to install the software components on or remove the software components from the device; and
    presenting a status panel associated with the installation or removal of the software to a user, the status panel identifying the plurality of operations associated with the installation or removal of the software and a status of each of the operations, the status panel comprising:
        information identifying a progress of the operation currently being performed during the installation or removal of the software, the information identifying the progress of the operation currently being performed including an estimated remaining time for the operation currently being performed;
        information identifying an overall progress of the installation or removal of the software, the information identifying the overall progress of the installation or removal of the software including an estimated remaining time for the installation or removal of the software; and
        a plurality of visual indicators, each visual indicator identifying the status of an associated one of the operations, wherein:
            each operation that has been completed is associated with a first type of visual indicator;
            the operation currently being performed during the installation or removal of the software is associated with a second type of visual indicator; and
            each operation that has not been completed and that is not currently being performed is associated with a third type of visual indicator.

2. The method of claim 1, wherein the status panel further comprises information on a number of steps in the installation or removal of the software and information about a current step being performed.

3. The method of claim 1, further comprising:
    employing a process product dispatcher to dispatch a first of the software components to a first of the installers and a second of the software components to a second of the installers; and
    employing the process product dispatcher to coordinate execution of the installers to install the software components according to a set of specified criteria.

4. The method of claim 1, wherein the information identifying the progress of the operation currently being performed includes a start time of the operation currently being performed.

5. The method of claim 1, wherein the status panel further comprises at least one indicator that repeatedly changes to indicate that the installation or removal of the software is progressing.

6. The method of claim 1, wherein the operation currently being performed is highlighted in a list of operations in the status panel.

7. The method of claim 1, wherein:
    each operation that has been completed is associated with a first type of text in a list of operations in the status panel;
    the operation currently being performed during the installation or removal of the software is associated with a second type of text in the list of operations; and
    each operation that has not been completed and that is not currently being performed is associated with a third text in the list of operations.

8. The method of claim 1, wherein the information identifying the overall progress of the installation or removal of the software further comprises a total time estimated for the installation or removal of the software.

9. An apparatus, comprising:
    at least one processor configured to initiate an installation of software on a device or a removal of software from the device, the installation or removal of the software involving a plurality of operations, the software comprising a plurality of software components, each operation associated with at least one of the software components, the at least one processor configured to execute a plurality of installers that are configured to install the software components on or remove the software components from the device; and
    a display configured to present a status panel associated with the installation or removal of the software to a user, the status panel identifying the operations associated with the installation or removal of the software and a status of each of the operations, the status panel comprising:
        information identifying a progress of the operation currently being performed during the installation or removal of the software, the information identifying the progress of the operation currently being performed including an estimated remaining time for the operation currently being performed;
        information identifying an overall progress of the installation or removal of the software, the information identifying the overall progress of the installation or removal of the software including an estimated remaining time for the installation or removal of the software; and
        a plurality of visual indicators, each visual indicator identifying the status of an associated one of the operations, wherein:
            each operation that has been completed is associated with a first type of visual indicator;
            the operation currently being performed during the installation or removal of the software is associated with a second type of visual indicator; and each operation that has not been completed and that is not currently being performed is associated with a third type of visual indicator.

10. The apparatus of claim 9, wherein the status panel further comprises information on a number of steps in the installation or removal of the software and information about a current step being performed.

11. The apparatus of claim 9, wherein the at least one processor is further configured to execute a process product dispatcher that is configured to (i) dispatch a first of the software components to a first of the installers and a second of the software components to a second of the installers and (ii) coordinate execution of the installers to install the software components according, to a set of specified criteria.

12. The apparatus of claim 9, wherein the information identifying the progress of the operation currently being performed includes a start time of the operation currently being performed.

13. The apparatus of claim 9, wherein the operation currently being performed is highlighted in a list of operations in the status panel.

14. The apparatus of claim 9, wherein the at least one processor is further configured to:
receive configuration information associated with a configuration of the installation of the software on the device, the configuration information including a type or types of network coupled to the device; and
select one or more of the software components to be installed on the device based on the configuration information.

15. The apparatus of claim 9, wherein the device comprises one of:
the apparatus formed from the at least one processor and the display; and
a device separate from the apparatus formed from the at least one processor and the display.

16. A non-transitory computer readable storage medium embodying a computer program, the computer program comprising:
computer readable program code for generating a status panel associated with installation of software on a device or removal of software from the device, the installation or removal of the software involving a plurality of operations, the software comprising a plurality of software components, each operation associated with at least one of the software components; and
computer readable program code for installing the software components on or removing the software components from the device;
the status panel identifying the operations associated with the installation or removal of the software and a status of each of the operations; and
the computer program further comprising computer readable program code for outputting the status panel for presentation to a user, wherein the status panel comprises:
information identifying a progress of the operation currently being performed during the installation or removal of the software, the information identifying the progress of the operation currently being performed including an estimated remaining time for the operation currently being performed;
information identifying an overall progress of the installation or removal of the software, the information identifying the overall progress of the installation or removal of the software including an estimated remaining time for the installation or removal of the software; and
a plurality of visual indicators, each visual indicator identifying the status of an associated one of the operations, wherein:
each operation that has been completed is associated with a first type of visual indicator;
the operation currently being performed during the installation or removal of the software is associated with a second type of visual indicator; and
each operation that has not been completed and that is not currently being performed is associated with a third type of visual indicator.

17. The computer readable storage medium of claim 16, wherein the status panel further comprises information on a number of steps in the installation or removal of the software and information about a current step being performed.

18. The computer readable storage medium of claim 16, wherein the information identifying the progress of the operation currently being performed includes a start time of the operation currently being performed.

19. The computer readable storage medium of claim 16, wherein the computer program further comprises:
computer readable program code for dispatching a first of the software components to a first of the installers and a second of the software components to a second of the installers; and
computer readable program code for coordinating execution of the installers to install the software components according to a set of specified criteria.

20. The computer readable storage medium of claim 16, wherein the status panel further comprises at least one indicator that repeatedly changes to indicate that the installation or removal of the software is progressing.

* * * * *